(12) United States Patent
Yamazaki et al.

(10) Patent No.: US 8,238,077 B2
(45) Date of Patent: Aug. 7, 2012

(54) DIELECTRIC CERAMICS AND MULTILAYER CERAMIC CAPACITOR

(75) Inventors: Youichi Yamazaki, Kirishima (JP); Hideyuki Osuzu, Kirishima (JP); Yoshihiro Fujioka, Kirishima (JP); Daisuke Fukuda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 321 days.

(21) Appl. No.: 12/567,632

(22) Filed: Sep. 25, 2009

(65) Prior Publication Data

US 2010/0014214 A1 Jan. 21, 2010

Related U.S. Application Data

(63) Continuation-in-part of application No. PCT/JP2008/055768, filed on Mar. 26, 2008.

(30) Foreign Application Priority Data

Mar. 27, 2007 (JP) .................................. 2007-082905

(51) Int. Cl.
*H01G 4/06* (2006.01)
*C04B 35/00* (2006.01)

(52) U.S. Cl. ................... 361/321.4; 361/321.5; 501/137
(58) Field of Classification Search .... 361/321.1–321.5, 361/311; 501/137–139
See application file for complete search history.

(56) References Cited

U.S. PATENT DOCUMENTS

| 7,898,793 | B2* | 3/2011 | Ito et al. ..................... 361/321.4 |
| 2007/0025060 | A1 | 2/2007 | Kim et al. |
| 2007/0155613 | A1* | 7/2007 | Ito et al. ......................... 501/137 |
| 2008/0253060 | A1* | 10/2008 | Ito et al. ..................... 361/321.4 |

FOREIGN PATENT DOCUMENTS

| JP | 2001-220224 A | 8/2001 |
| JP | 2006-232629 A | 9/2006 |
| JP | 2007-31273 A | 2/2007 |

* cited by examiner

*Primary Examiner* — Eric Thomas
(74) *Attorney, Agent, or Firm* — Birch, Stewart, Kolasch & Birch, LLP

(57) ABSTRACT

A dielectric ceramic exhibiting a high dielectric constant is provided. The relative dielectric constant of the dielectric ceramic is stable with respect to temperature dependence and exhibits insulation resistance having a reduced voltage dependence. The dielectric ceramic of the invention can be used to form a multilayer ceramic capacitor that has a long life.

8 Claims, 2 Drawing Sheets

DIELECTRIC CERAMICS AND MULTILAYER CERAMIC CAPACITOR

CROSS-REFERENCE TO RELATED APPLICATION

The present application is a continuation in part based on PCT application No. JP2008/055768, filed on Mar. 26, 2008 which claims the benefit of Japanese Patent Applications No. 2007-017860, filed on Nov. 29, 2006, No. 2007-082905, filed on Mar. 27, 2007, entitled "DIELECTRIC CERAMICS AND MULTILAYER CERAMIC CAPACITOR," the content of which is incorporated by reference herein in its entirety.

FIELD

Embodiments of the present invention relate generally to dielectric ceramics, and more particularly relate to dielectric ceramics operable for use in a multilayer ceramic capacitor.

BACKGROUND

In recent years, mobile devices such as mobile phones have come into widespread use, and higher speed and higher frequency semiconductor elements have been used as main components of personal computers. To support the high frequencies in a small package, there has been a growing demand for smaller multilayer ceramic capacitors having higher capacitances for use in these electronic devices. These multilayer ceramic capacitors are therefore required to include a larger number of dielectric layers having a smaller thickness.

Dielectric ceramics for dielectric layers of multilayer ceramic capacitors may include barium titanate as a main component. Crystal grains having a core-shell structure have recently been developed for dielectric ceramics and are used in practical multilayer ceramic capacitors.

The term "core-shell structure" of a crystal grain, as used herein, refers to a structure in which an inner core and an outer shell of the crystal grain form physically and chemically different phases. In a crystal grain comprising barium titanate as a main component, the inner core has a tetragonal crystal structure and the outer shell has a cubic crystal structure.

A dielectric ceramics comprising crystal grains having such a core-shell structure can have a high relative dielectric constant with a stable temperature dependence. However, as a direct-current voltage applied to the dielectric ceramics increases, an insulation resistance of the dielectric ceramics decreases (hereinafter referred to as the voltage dependence of insulation resistance).

In a multilayer ceramic capacitor that includes ceramic dielectric layers formed of such core-shell crystal grains, such an increased voltage dependence of the insulation resistance of the dielectric ceramics makes it difficult to improve the life of the multilayer ceramic capacitor in a high-temperature durability test.

Accordingly, there is a need for a dielectric ceramics that has a high dielectric constant, a relative dielectric constant with a stable temperature dependence, and an insulation resistance with a reduced voltage dependence. Furthermore, there is a need for a multilayer ceramic capacitor that has high-temperature durability and a long operating life.

SUMMARY

A dielectric ceramics comprising a high dielectric constant is disclosed. The dielectric ceramics also comprises a relative dielectric constant with a stable temperature dependence and an insulation resistance with a reduced voltage dependence. The dielectric ceramics can be used to form a multilayer ceramic capacitor that has a long life.

A first embodiment comprises a dielectric ceramics. The dielectric ceramics comprises a plurality of crystal grains comprising a core-shell structure and comprising barium titanate as a main component, and at least one grain boundary phase between the crystal grains. The dielectric ceramics further comprises vanadium equivalent to 0.1 to 0.2 mol of $V_2O_5$, magnesium equivalent to 0.55 to 0.75 mol of MgO, at least one rare-earth element (RE) equivalent to 0.55 to 0.75 mol of $RE_2O_3$. The rare-earth element (RE) being selected from at least one of yttrium, dysprosium, holmium, erbium, and terbium. The dielectric ceramics also comprises manganese equivalent to 0.25 to 0.6 mol of MnO, per 100 mol of barium of the barium titanate, and has a Curie temperature in the range of 80° C. to 90° C.

A second embodiment comprises a multilayer ceramic capacitor. The multilayer ceramic capacitor comprises at least one dielectric layer comprising a dielectric ceramics comprising a plurality of crystal grains comprising a core-shell structure and comprising barium titanate as a main component, and at least one grain boundary phase between the crystal grains. The multilayer ceramic capacitor further comprises vanadium equivalent to 0.1 to 0.2 mol of $V_2O_5$, magnesium equivalent to 0.55 to 0.75 mol of MgO, at least one rare-earth element (RE) equivalent to 0.55 to 0.75 mol of $RE_2O_3$. The rare-earth element being selected from at least one of yttrium, dysprosium, holmium, erbium, and terbium. The multilayer ceramic capacitor further comprises manganese equivalent to 0.25 to 0.6 mol of MnO, per 100 mol of barium of the barium titanate, and has a Curie temperature in the range of 80° C. to 90° C. The multilayer ceramic capacitor further comprises at least one internal electrode layer, alternately stacked.

A third embodiment comprises a method for producing a dielectric ceramics. The method comprises providing a plurality of crystal grains comprising a core-shell structure and comprising barium titanate as a main component, and providing at least one grain boundary phase between the crystal grains. The method further comprises providing vanadium equivalent to 0.1 to 0.2 mol of $V_2O_5$, magnesium equivalent to 0.55 to 0.75 mol of MgO, at least one rare-earth element (RE) equivalent to 0.55 to 0.75 mol of $RE_2O_3$. The rare-earth element (RE) being selected from at least one of yttrium, dysprosium, holmium, erbium, and terbium. The method further comprises providing manganese equivalent to 0.25 to 0.6 mol of MnO, per 100 mol of barium of the barium titanate, which has a Curie temperature in a range of 80° C. to 90° C.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of one practical non-limiting application, namely, a multilayer ceramic capacitor. Embodiments of the invention, however, are not limited to such ceramic capacitor, and the techniques described herein may also be utilized in other applications. For example, embodiments may be applicable to a ceramic insulator and the like.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

A dielectric ceramics according to an embodiment of the present invention includes crystal grains and grain boundary phases between or among the crystal grains. The crystal grains substantially have a core-shell structure and comprise barium titanate as a main component and therefore, hereinafter such a crystal grain may be referred to as barium titanate crystal grain. The dielectric ceramics may contain vanadium, magnesium, at least one rare-earth element such as but without limitation, yttrium, dysprosium, holmium, erbium, terbium, manganese, and the like.

Figure 1A:
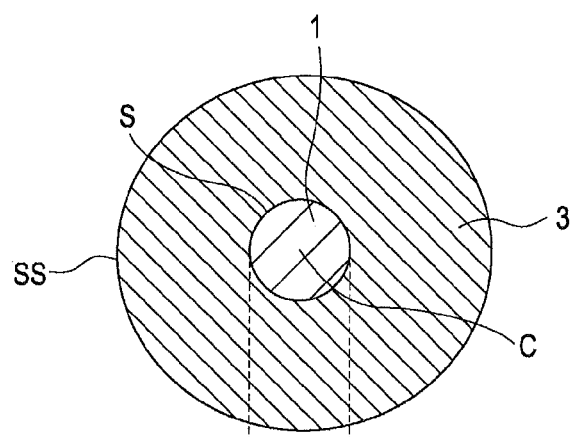
FIG. 1A is an illustration of a schematic cross-sectional view of a core-shell crystal grain in a dielectric ceramics according to an embodiment of the present invention.
Figure 1B:
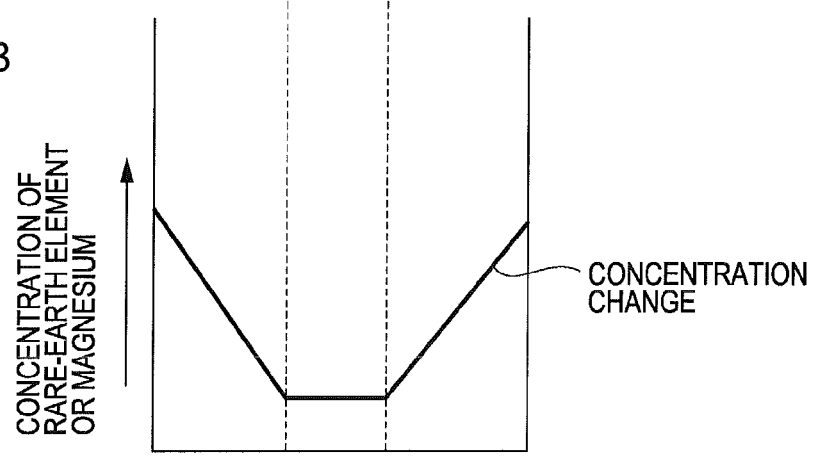
FIG. 1B is an illustration of changes in the concentration of a rare-earth element or magnesium in the cross section of FIG. 1A.

As illustrated in FIGS. 1A and 1B, a crystal grain having a core-shell structure includes a core 1 and a shell 3 surrounding the core 1. The core 1 and the shell 3 comprises barium titanate as a main component.

The barium titanate crystal grain comprises a solid solution of vanadium, magnesium, a rare-earth element, and manganese. The concentration gradient of magnesium or a rare-earth element is greater in the shell 3 than that in the core 1.

For example, as shown in FIG. 1B, a change in the concentration of a rare-earth element or magnesium from an outermost surface SS to the core 1 of the crystal grain is greater than a change in the concentration of a rare-earth element or magnesium from the surface S of the core 1 to the center C of the core 1.

In core-shell crystal grains that form a dielectric ceramics, the shell 3 is a portion in which a concentration of a rare-earth element or magnesium is highest at the outermost surface SS of the crystal grain and decreases inwardly at 0.05% by atom/nm or more. The core 1 is a portion in which a change in the concentration of a rare-earth element or magnesium is smaller than that in the shell 3 having a concentration gradient less than 0.05% by atom/nm.

The concentration of a rare-earth element or magnesium is measured with a transmission electron microscope equipped with an elemental analyzer. The change in the concentration of a rare-earth element or magnesium is determined by performing an elementary analysis with an energy dispersive spectrometer (EDS) from the surface to the center C of a crystal grain at predetermined intervals.

A dielectric ceramics according to an embodiment of the present invention comprises vanadium equivalent to 0.1 to 0.2 mol of $V_2O_5$, magnesium equivalent to 0.55 to 0.75 mol of MgO, at least one rare-earth element (RE) equivalent to 0.55 to 0.75 mol of $RE_2O_3$. The rare-earth element RE may be selected from at least one of, for example but without limitation, yttrium, dysprosium, holmium, erbium, and terbium. The dielectric ceramics also comprises manganese equivalent to 0.25 to 0.6 mol of MnO, per 100 mol of barium contained in the crystal grains forming the dielectric ceramics.

A dielectric ceramics according to an embodiment of the present invention has a Curie temperature in the range of 80° C. to 90° C. (that is, the Curie temperature is shifted toward room temperature). The term "Curie temperature", as used herein, refers to a temperature at which the relative dielectric constant is highest in a measurement range of a temperature dependence of relative dielectric constant (i.e., −60° C. to 150° C.).

When a dielectric ceramics has the composition and the Curie temperature in the ranges described above, the dielectric ceramics can have a relative dielectric constant of at least 3800 at room temperature (25° C.) and a temperature dependence of relative dielectric constant satisfying X5R (a change in relative dielectric constant at a temperature in the range of −55° C. to 85° C. is ±15% or less of the relative dielectric constant at 25° C.). Furthermore, under these conditions, the insulation resistance can advantageously be $10^{10} \Omega$ or more at a direct-current voltage per unit thickness (1 μm) of 12.5 V.

The dielectric ceramics can therefore have a higher dielectric constant than conventional dielectric ceramics that are formed of core-shell crystal grains mainly composed of barium titanate having a Curie temperature of approximately 125° C. In addition, in the core-shell crystal grains of the dielectric ceramics of the present embodiment, a volume percentage of the core 1 decreases, and the volume percentage of the shell 3 increases, as compared to conventional core-shell crystal grains. As a result, a dielectric ceramics can have high insulation resistance.

However, at a vanadium content equivalent to less than 0.1 mol or more than 0.2 mol of $V_2O_5$, a magnesium content equivalent to less than 0.55 mol or more than 0.75 mol of MgO, a rare-earth element RE (comprising at least one of the group consisting of yttrium, dysprosium, holmium, erbium, and terbium) content equivalent to less than 0.55 mol or more than 0.75 mol of $RE_2O_3$, or a manganese content equivalent to less than 0.25 mol of MnO, per 100 mol of barium, the insulation resistance at a direct-current voltage per unit thickness of 12.5 V may be lower than $10^{10} \Omega$. At a manganese content equivalent to more than 0.6 mol of MnO per 100 mol of barium, the relative dielectric constant may decrease. Thus, a dielectric ceramics according to an embodiment of the present invention contains vanadium equivalent to 0.1 to 0.2 mol of $V_2O_5$, magnesium equivalent to 0.55 to 0.75 mol of MgO, a rare-earth element RE (comprising at least one of the group consisting of yttrium, dysprosium, holmium, erbium, and terbium) equivalent to 0.55 to 0.75 mol of $RE_2O_3$, and manganese equivalent to 0.25 to 0.6 mol of MnO, per 100 mol of barium.

In an embodiment of the present invention, a dielectric ceramics can contain vanadium equivalent to 0.1 to 0.2 mol of $V_2O_5$, magnesium equivalent to 0.55 to 0.75 mol of MgO, a rare-earth element RE (at least one selected from the group consisting of yttrium, dysprosium, holmium, erbium, and terbium) equivalent to 0.55 to 0.75 mol of $RE_2O_3$, and manganese equivalent to 0.25 to 0.35 mol of MnO, per 100 mol of barium. The dielectric ceramics having such a composition can shows little decrease in insulation resistance when the direct-current voltage per unit thickness is increased from 3.15 to 12.5 V.

In an embodiment of the present invention, yttrium may be chosen as the rare-earth element to achieve a high relative dielectric constant and high insulation resistance.

Although an average size of crystal grains of a dielectric ceramics may be large to increase dielectric constant, the average size of the crystal grains is preferably 0.5 µm or less to decrease variations in capacitance. More preferably, the average size of the crystal grains ranges from 0.25 to 0.35 µm. A dielectric ceramics formed of crystal grains having an average size in the range of 0.25 µm to 0.35 µm can have high insulation resistance, which increases when the direct-current voltage per unit thickness (1 µm) of the dielectric ceramics is increased from 3.15 to 12.5 V (positive change).

A method for manufacturing a dielectric ceramics is described below.

First, a barium titanate powder having a purity of 99% or more is mixed with a $V_2O_5$ powder, a MgO powder, at least one rare-earth oxide powder selected from the group consisting of an $Y_2O_3$ powder, a $Dy_2O_3$ powder, a $Ho_2O_3$ powder, an $Er_2O_3$ powder, and a $Te_2O_3$ powder, and a $MnCO_3$ powder to prepare a raw powder.

In an embodiment, the barium titanate powder has an average particle size in the range of 0.05 to 0.15 µm. A barium titanate powder having an average particle size of 0.05 µm or more can easily form a crystal grain having a core-shell structure, which can comprise a high proportion of core 1. A dielectric ceramics can therefore have an improved relative dielectric constant. At an average particle size of the barium titanate powder of 0.15 µm or less, the additive powders, such as the $V_2O_5$ powder, can form a solid solution deep inside a crystal grain, and as described below, the barium titanate powder can grow to a crystal grain at a high growth ratio by firing.

In an embodiment, the additive powders, (i.e., the at least one rare-earth oxide powder selected from the group consisting of the $Y_2O_3$ powder, the $Dy_2O_3$ powder, the $Ho_2O_3$ powder, the $Er_2O_3$ powder, and the $Te_2O_3$ powder, the $V_2O_5$ powder, the MgO powder, and the $MnCO_3$ powder) can have an average particle size equal to or less than the average particle size of the barium titanate powder.

To prepare a raw powder in an embodiment, 0.1 to 0.2 mol of $V_2O_5$ powder, 0.55 to 0.75 mol of MgO powder, 0.55 to 0.75 mol of rare-earth oxide powder, and the $MnCO_3$ powder equivalent to 0.25 to 0.6 mol of MnO per 100 mol of barium of the barium titanate powder are mixed.

A glass powder can be then added to the raw powder as a sintering aid. The resulting mixture and an organic vehicle can be mixed in a ball mill. The resulting mixture is formed into a powder compact having a predetermined shape. The powder compact is degreased and fired in a reducing atmosphere including, without limitation, $10^{-8}$ to $10^{-3}$ Pa of oxygen.

The firing temperature can be in a range from 1100° C. to 1150° C. to promote the formation of a solid solution between the barium titanate powder and the additive powders and to control the growth of crystal grains.

In an embodiment, a powder compact comprising a mixture of a fine barium titanate powder and predetermined amounts of the additive powders is fired at the above-mentioned temperature such that an average size of crystal grains after firing is at least twice an average particle size of the mixed powder before firing. This promotes formation of a solid solution of the additive powders in the crystal grains and thereby can decrease the volume percentage of the core 1 and increase the volume percentage of the shell 3.

In an embodiment, the crystal grains after firing are heat-treated in a mild reducing atmosphere including, without limitation, $10^{-2}$ to 10 Pa of oxygen. The heat treatment reoxidizes the crystal grains reduced by firing in the reducing atmosphere to recover the insulation resistance of the dielectric ceramics, which was decreased by reduction during the firing process. Preferably, the heat treatment is performed at a temperature in the range of 900° C. to 1100° C. to prevent further growth of the crystal grains and to promote reoxidation of the crystal grains.

In this manner, the volume percentage of the insulating shell 3 in the crystal grains can increase, and the resulting dielectric ceramics can have a Curie temperature in the range of 80° C. to 90° C.

Figure 2:
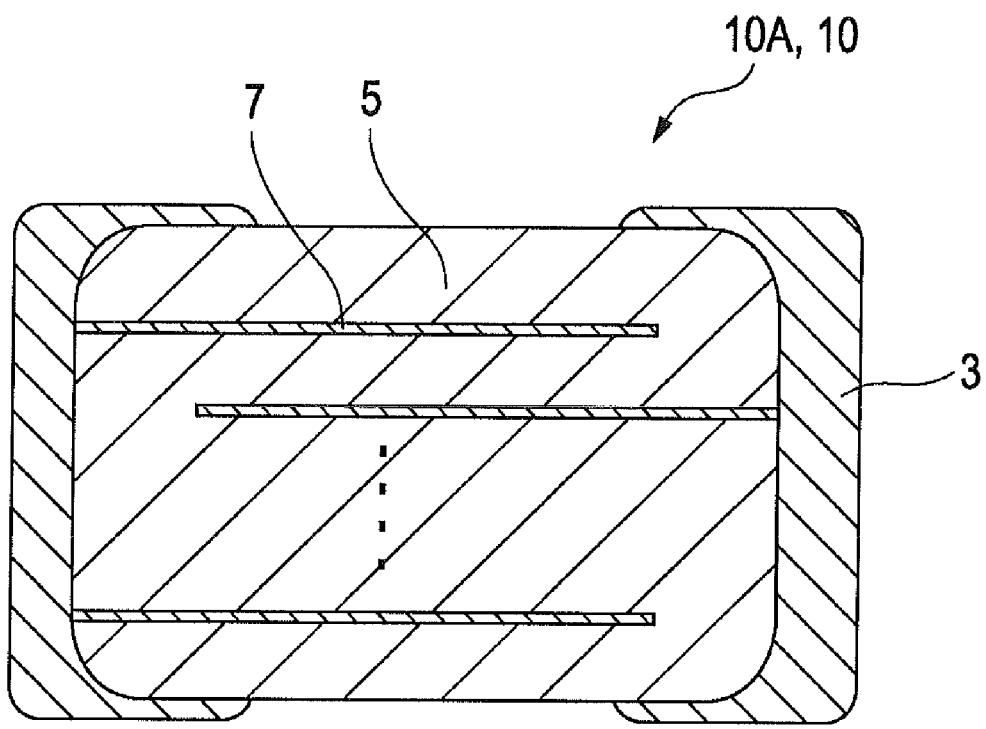
FIG. 2 is an illustration of a longitudinal sectional view of a multilayer ceramic capacitor according to an embodiment of the present invention.

As illustrated in FIG. 2, a multilayer ceramic capacitor according to an embodiment of the present invention comprising external electrodes 3 on two opposite sides of a main body 10. The main body 10 comprises a laminate 10A. The laminate 10A comprises a plurality of dielectric layers 5 and a plurality of internal electrode layers 7 alternately stacked. The dielectric layers 5 comprise the dielectric ceramics described above. Even when the dielectric layers 5 have a small thickness, a multilayer ceramic capacitor can have high insulation resistance and a long life in a high-temperature durability test.

In an embodiment, to decrease a size and increase a capacitance of the multilayer ceramic capacitor, the dielectric layers 5 can have a thickness of 3 µm or less, more preferably 2.5 µm or less. In an embodiment, to prevent variations in capacitance and stabilize the temperature dependence of capacitance, the dielectric layers 5 can have a thickness of 1 µm or more.

In an embodiment, to decrease manufacturing costs even with a large number of internal electrode layers 7, the internal electrode layers 7 can comprise a base metal, such as nickel (Ni) or copper (Cu). In consideration of co-firing with the dielectric layers 5, nickel (Ni) can be used for the internal electrode layers 7.

The external electrodes 3 may be formed by baking Cu or a Cu—Ni alloy paste.

A method for manufacturing a multilayer ceramic capacitor is described below.

In an embodiment of the present invention, the raw powder and an organic vehicle are mixed to prepare ceramic slurry. The ceramic slurry is formed into ceramic green sheets by a sheet forming method, such as a doctor blade method or a die coater method. To decrease the thickness of dielectric layers for higher capacitance and maintain high insulation resistance, each of the ceramic green sheet preferably has a thickness in a range of 1 to 4 µm.

A rectangular internal electrode pattern is then printed on a main surface of the ceramic green sheet.

A desired number of ceramic green sheets on which the internal electrode pattern is formed are then stacked. On a top and a bottom of the stacked ceramic green sheets, upper and lower ceramic green sheets where each has no internal electrode pattern are stacked, respectively, to form a laminated sheet. A number of the upper ceramic green sheets can be the same as the number of the lower ceramic green sheets. In an embodiment, the intermediate ceramic green sheets are stacked such that half of an internal electrode pattern overlaps with half of another internal electrode pattern in the longitudinal direction.

Then, the laminated sheet is cut in gridlike fashion, for example, to expose ends of the internal electrode patterns, forming a capacitor main body green laminate. Ends of internal electrode patterns are alternately exposed on two opposite sides of the capacitor main body green laminate.

The capacitor main body green laminate is degreased, fired, and heat-treated in the mild reducing atmosphere, as described above, thus forming a capacitor main body. An external electrode paste is applied to two opposite sides of the main body and is baked to form external electrodes. Plating films may be formed on the external electrodes to facilitate packaging.

EXAMPLES

To prepare raw powders, a barium titanate powder (hereinafter referred to as a BT powder), a MgO powder, an $Y_2O_3$ powder, a $Dy_2O_3$ powder, a $Ho_2O_3$ powder, an $Er_2O_3$ powder, a $Tb_2O_3$ powder, a $MnCO_3$ powder, and a $V_2O_5$ powder, all of which had a purity of 99.9%, were mixed in the proportions described in Tables 1 and 2.

Tables 1 and 2 also show an average particle size of the BT powder. The MgO powder, the $Y_2O_3$ powder, the $Dy_2O_3$ powder, the $Ho_2O_3$ powder, the $Er_2O_3$ powder, the $Tb_2O_3$ powder, the $MnCO_3$ powder, and the $V_2O_5$ powder had an average particle size of 0.1 μm. The Ba/Ti ratio of the BT powder was 1.005. A glass powder having a composition of 55% by mole of $SiO_2$, 20% by mole of BaO, 15% by mole of CaO, and 10% by mole of $Li_2O$ was used as a sintering aid One part by mass of the glass powder was added to 100 parts by mass of the BT powder.

The raw powder was added to a mixed solvent of toluene and an alcohol and was wet-blended with zirconia balls having a diameter of 5 mm.

A poly(vinyl butyral) resin and a mixed solvent of toluene and an alcohol were added to the wet-blended powder and were wet-blended with zirconia balls having a diameter of 5 mm to prepare a ceramic slurry. The ceramic slurry was formed into a ceramic green sheet having a thickness of 2.5 μm by a doctor blade method.

A plurality of rectangular internal electrode patterns mainly composed of Ni was then formed on the ceramic green sheet. A conductive paste used in the formation of the internal electrode pattern contained 100 parts by mass of Ni powder having an average particle size of 0.3 μm and 30 parts by mass of the BT powder used in the green sheet.

Three hundred and sixty ceramic green sheets on which the internal electrode pattern was printed were stacked. On the top and the bottom of the ceramic green sheets, 20 upper ceramic green sheets and 20 lower ceramic green sheets were stacked. The upper and lower ceramic green sheets had no internal electrode pattern. Pressing at a temperature of 60° C. and a pressure of $10^7$ Pa for 10 minutes and cutting yielded laminated sheets.

The laminated sheets were heated to 300° C. at a heating rate of 10° C./h in the atmosphere to remove the binder. The laminated sheets were then heated to a temperature in the range of 1100° C. to 1145° C. at a heating rate of 300° C./h from 500° C. and were fired in a hydrogen-nitrogen atmosphere at that temperature for two hours. In the hydrogen-nitrogen atmosphere, oxygen partial pressure is $10^{-8}$ to $10^{-3}$ Pa. The laminated sheets were then cooled to 1000° C. at a cooling rate of 300° C./h, was reoxidized at 1000° C. in a nitrogen atmosphere for four hours, and was cooled at a cooling rate of 300° C./h, forming a capacitor main body. In the nitrogen atmosphere, oxygen partial pressure is $10^{-2}$ to 10 Pa.

The main body had a size of 0.95 (mm)×0.48 (mm)×0.48 (mm). The dielectric layers had a thickness of 2 μm. The internal electrode layers had an effective area of 0.3 $mm^2$/layer. The term "effective area", as used herein, refers to an overlapping area of two adjacent internal electrode layers in which an end of one internal electrode layer was exposed on one side of the main body and an end of the other internal electrode layer was exposed on the opposite side.

After the capacitor main body was subjected to barrel polishing, an external electrode paste, which contained a Cu powder and glass, was applied to two opposite sides of the main body and was baked at 850° C. to form external electrodes. The external electrodes were then coated with Ni and then with Sn in an electrolytic barrel to complete a multilayer ceramic capacitor.

The multilayer ceramic capacitor was evaluated as described below.

Unless otherwise specified, 10 samples were evaluated, and measurements were averaged.

The relative dielectric constant was determined from the capacitance measured at a temperature of 25° C., a frequency of 1.0 kHz, and a voltage of 1 Vrms, the thickness of a dielectric layer, and the effective area of an internal electrode layer. The temperature dependence of relative dielectric constant was evaluated by measuring capacitance at a temperature in the range of −55° C. to 85° C. The Curie temperature was a temperature at which the relative dielectric constant was highest in the measurement range of the temperature dependence of relative dielectric constant.

The insulation resistance was measured at direct-current voltages of 6.3 V (3.15 V per unit thickness) and 25 V (12.5 V per unit thickness).

High-temperature durability tests were performed at a temperature of 85° C. and applied voltages of 9.45 and 12.6 V for 1000 hours. A sample having no defect was judged as "pass". The number of samples in the high-temperature durability test was 20.

The average size of crystal grains in a dielectric layer was determined with a scanning electron microscope (SEM). More specifically, a polished surface was etched, 20 crystal grains in an electron micrograph were arbitrarily selected, the maximum diameter of each of the crystal grains was measured by an intercept method, and the maximum diameters were averaged. The grain growth ratio of a dielectric powder was determined from the average size of crystal grains. The grain growth ratio is a ratio of the average size of crystal grains in a dielectric ceramics after sintering to the average particle size of a BT powder.

The composition of a sample (dielectric ceramics) was analyzed by an ICP analysis or atomic absorption spectrometry. More specifically, a sample was melted together with boric acid and sodium carbonate, the molten sample was dissolved in hydrochloric acid, and elements of the dielectric ceramics was identified by atomic absorption spectrometry.

The identified elements were then quantified by ICP spectroscopy using a diluted standard solution as a standard. The amount of oxygen was determined on the assumption that the elements have valences listed in a periodic table.

Tables 1 and 2 exemplarily show composition of a raw powder and the firing temperature according to an embodiment of the present invention.

Tables 3 and 4 exemplarily show composition of a sintered product (dielectric ceramics) according to an embodiment of the present invention.

Tables 5 and 6 exemplarily show evaluation results according to an embodiment of the present invention.

The concentration distribution of a rare-earth element (RE) of crystal grains in a sample (dielectric ceramics) was determined with a transmission electron microscope equipped with an elemental analyzer. In all the samples, the concentration gradient of a rare-earth element of a crystal grain was 0.05% by atom/nm or more in a shell and less than 0.05% by atom/nm in a core. Thus, the crystal grain had a core-shell structure in which the concentration gradient of a rare-earth element was higher in the shell than in the core.

The concentration of a rare-earth element (RE) in a crystal grain was determined as the proportion to the total amount of Ba, Ti, V, Mg, RE, and Mn detected at a spot size of an electron beam of 3 nm. The concentration gradients of a rare-earth element (RE) in the shell and the core were determined as follows: the concentrations of the rare-earth element on a straight line between a grain boundary (shell) and a center (core) of a crystal grain were measured from the grain boundary at intervals in the range of 5 to 10 nm; the concentrations of the rare-earth element were plotted as a function of the distance from the grain boundary; two least squares approximation lines were drawn from a point at which the concentration gradient of the rare-earth element changed drastically; and the concentration gradients in the shell and the core were determined from the inclinations of the two lines.

TABLE 1

| Sample No. | Average particle size of BT powder μm | $V_2O_5$ mol | MgO mol | $RE_2O_3$ Element | mol | $MnCO_3$ mol | Firing temperature °C. |
|---|---|---|---|---|---|---|---|
| 1 | 0.1 | 0.05 | 0.75 | $Y_2O_3$ | 0.75 | 0.3 | 1130 |
| 2 | 0.1 | 0.1 | 0.75 | $Y_2O_3$ | 0.75 | 0.3 | 1130 |
| 3 | 0.1 | 0.15 | 0.75 | $Y_2O_3$ | 0.75 | 0.3 | 1130 |
| 4 | 0.1 | 0.2 | 0.75 | $Y_2O_3$ | 0.75 | 0.3 | 1130 |
| 5 | 0.1 | 0.3 | 0.75 | $Y_2O_3$ | 0.75 | 0.3 | 1130 |
| 6 | 0.1 | 0.1 | 0.4 | $Y_2O_3$ | 0.75 | 0.3 | 1130 |
| 7 | 0.1 | 0.1 | 0.5 | $Y_2O_3$ | 0.75 | 0.3 | 1130 |
| 8 | 0.1 | 0.1 | 0.55 | $Y_2O_3$ | 0.75 | 0.3 | 1130 |
| 9 | 0.1 | 0.1 | 0.6 | $Y_2O_3$ | 0.75 | 0.3 | 1130 |
| 10 | 0.1 | 0.1 | 0.65 | $Y_2O_3$ | 0.75 | 0.3 | 1130 |
| 11 | 0.1 | 0.1 | 0.8 | $Y_2O_3$ | 0.75 | 0.3 | 1130 |
| 12 | 0.1 | 0.1 | 1 | $Y_2O_3$ | 0.75 | 0.3 | 1130 |
| 13 | 0.1 | 0.1 | 1.1 | $Y_2O_3$ | 0.75 | 0.3 | 1130 |
| 14 | 0.1 | 0.1 | 0.75 | $Y_2O_3$ | 0.4 | 0.3 | 1130 |
| 15 | 0.1 | 0.1 | 0.75 | $Y_2O_3$ | 0.5 | 0.3 | 1130 |
| 16 | 0.1 | 0.1 | 0.75 | $Y_2O_3$ | 0.55 | 0.3 | 1130 |
| 17 | 0.1 | 0.1 | 0.75 | $Y_2O_3$ | 0.6 | 0.3 | 1130 |
| 18 | 0.1 | 0.1 | 0.75 | $Y_2O_3$ | 0.65 | 0.3 | 1130 |
| 19 | 0.1 | 0.1 | 0.75 | $Y_2O_3$ | 0.8 | 0.3 | 1130 |
| 20 | 0.1 | 0.1 | 0.75 | $Y_2O_3$ | 1 | 0.3 | 1130 |
| 21 | 0.1 | 0.1 | 0.75 | $Y_2O_3$ | 1.1 | 0.3 | 1130 |

TABLE 2

| Sample No. | Average particle size of BT powder μm | $V_2O_5$ mol | MgO mol | $RE_2O_3$ Element | mol | $MnCO_3$ mol | Firing temperature °C. |
|---|---|---|---|---|---|---|---|
| 22 | 0.1 | 0.1 | 0.75 | $Y_2O_3$ | 0.75 | 0.1 | 1130 |
| 23 | 0.1 | 0.1 | 0.75 | $Y_2O_3$ | 0.75 | 0.2 | 1130 |
| 24 | 0.1 | 0.1 | 0.75 | $Y_2O_3$ | 0.75 | 0.25 | 1130 |
| 25 | 0.1 | 0.1 | 0.75 | $Y_2O_3$ | 0.75 | 0.35 | 1130 |
| 26 | 0.1 | 0.1 | 0.75 | $Y_2O_3$ | 0.75 | 0.4 | 1130 |
| 27 | 0.1 | 0.1 | 0.75 | $Y_2O_3$ | 0.75 | 0.5 | 1130 |
| 28 | 0.1 | 0.1 | 0.75 | $Y_2O_3$ | 0.75 | 0.6 | 1130 |
| 29 | 0.1 | 0.1 | 0.75 | $Y_2O_3$ | 0.75 | 0.8 | 1130 |
| 30 | 0.1 | 0.1 | 0.75 | $Y_2O_3$ | 0.75 | 0.3 | 1130 |
| 31 | 0.1 | 0.1 | 0.75 | $Y_2O_3$ | 0.75 | 0.3 | 1140 |
| 32 | 0.1 | 0.1 | 0.75 | $Y_2O_3$ | 0.75 | 0.3 | 1150 |
| 33 | 0.1 | 0.1 | 0.75 | $Y_2O_3$ | 0.75 | 0.3 | 1100 |
| 34 | 0.1 | 0.1 | 0.75 | $Y_2O_3$ | 0.75 | 0.3 | 1145 |
| 35 | 0.3 | 0.1 | 0.75 | $Y_2O_3$ | 0.75 | 0.3 | 1145 |
| 36 | 0.2 | 0.1 | 0.75 | $Y_2O_3$ | 0.75 | 0.3 | 1130 |
| 37 | 0.1 | 0 | 0.75 | $Y_2O_3$ | 0.75 | 0.3 | 1130 |
| 38 | 0.1 | 0.15 | 0.75 | $Dy_2O_3$ | 0.75 | 0.3 | 1130 |
| 39 | 0.1 | 0.15 | 0.75 | $Ho_2O_3$ | 0.75 | 0.3 | 1130 |
| 40 | 0.1 | 0.15 | 0.75 | $Er_2O_3$ | 0.75 | 0.3 | 1130 |
| 41 | 0.1 | 0.15 | 0.75 | $Tb_2O_3$ | 0.75 | 0.3 | 1130 |
| 42 | 0.05 | 0.15 | 0.75 | $Y_2O_3$ | 0.75 | 0.3 | 1110 |
| 43 | 0.15 | 0.15 | 0.75 | $Y_2O_3$ | 0.75 | 0.3 | 1130 |

TABLE 3

| Sample No. | $V_2O_5$ mol | MgO mol | $RE_2O_3$ Element | mol | MnO mol |
|---|---|---|---|---|---|
| 1 | 0.05 | 0.75 | Y | 0.75 | 0.3 |
| 2 | 0.1 | 0.75 | Y | 0.75 | 0.3 |
| 3 | 0.15 | 0.75 | Y | 0.75 | 0.3 |
| 4 | 0.2 | 0.75 | Y | 0.75 | 0.3 |
| 5 | 0.3 | 0.75 | Y | 0.75 | 0.3 |
| 6 | 0.1 | 0.4 | Y | 0.75 | 0.3 |
| 7 | 0.1 | 0.5 | Y | 0.75 | 0.3 |
| 8 | 0.1 | 0.55 | Y | 0.75 | 0.3 |
| 9 | 0.1 | 0.6 | Y | 0.75 | 0.3 |
| 10 | 0.1 | 0.65 | Y | 0.75 | 0.3 |
| 11 | 0.1 | 0.8 | Y | 0.75 | 0.3 |
| 12 | 0.1 | 1 | Y | 0.75 | 0.3 |
| 13 | 0.1 | 1.1 | Y | 0.75 | 0.3 |
| 14 | 0.1 | 0.75 | Y | 0.4 | 0.3 |
| 15 | 0.1 | 0.75 | Y | 0.5 | 0.3 |
| 16 | 0.1 | 0.75 | Y | 0.55 | 0.3 |
| 17 | 0.1 | 0.75 | Y | 0.6 | 0.3 |
| 18 | 0.1 | 0.75 | Y | 0.65 | 0.3 |
| 19 | 0.1 | 0.75 | Y | 0.8 | 0.3 |
| 20 | 0.1 | 0.75 | Y | 1 | 0.3 |
| 21 | 0.1 | 0.75 | Y | 1.1 | 0.3 |

TABLE 4

| Sample No. | $V_2O_5$ mol | MgO mol | $RE_2O_3$ Element | mol | MnO mol |
|---|---|---|---|---|---|
| 22 | 0.1 | 0.75 | Y | 0.75 | 0.1 |
| 23 | 0.1 | 0.75 | Y | 0.75 | 0.2 |
| 24 | 0.1 | 0.75 | Y | 0.75 | 0.25 |
| 25 | 0.1 | 0.75 | Y | 0.75 | 0.35 |
| 26 | 0.1 | 0.75 | Y | 0.75 | 0.4 |
| 27 | 0.1 | 0.75 | Y | 0.75 | 0.5 |
| 28 | 0.1 | 0.75 | Y | 0.75 | 0.6 |
| 29 | 0.1 | 0.75 | Y | 0.75 | 0.8 |
| 30 | 0.1 | 0.75 | Y | 0.75 | 0.3 |
| 31 | 0.1 | 0.75 | Y | 0.75 | 0.3 |
| 32 | 0.1 | 0.75 | Y | 0.75 | 0.3 |
| 33 | 0.1 | 0.75 | Y | 0.75 | 0.3 |

TABLE 4-continued

| Sample No. | $V_2O_5$ mol | MgO mol | $RE_2O_3$ Element | $RE_2O_3$ mol | MnO mol |
|---|---|---|---|---|---|
| 34 | 0.1 | 0.75 | Y | 0.75 | 0.3 |
| 35 | 0.1 | 0.75 | Y | 0.75 | 0.3 |
| 36 | 0.1 | 0.75 | Y | 0.75 | 0.3 |
| 37 | 0 | 0.75 | Y | 0.75 | 0.3 |
| 38 | 0.15 | 0.75 | Dy | 0.75 | 0.3 |
| 39 | 0.15 | 0.75 | Ho | 0.75 | 0.3 |
| 40 | 0.15 | 0.75 | Er | 0.75 | 0.3 |
| 41 | 0.15 | 0.75 | Tb | 0.75 | 0.3 |
| 42 | 0.15 | 0.75 | Y | 0.75 | 0.3 |
| 43 | 0.15 | 0.75 | Y | 0.75 | 0.3 |

TABLE 5

| Sample No. | Average size of crystal grains μm | Grain growth ratio % | Curie temperature °C. | Relative dielectric constant (25° C.) — | Insulation resistance (6.3 Vdc) Ω | Insulation resistance (25 Vdc) Ω | Temperature dependence of relative dielectric constant X5R** | Life in high-temperature durability test 85° C., 9.45 V, 1000 h*** | Life in high-temperature durability test 85° C., 12.6 V, 1000 h**** |
|---|---|---|---|---|---|---|---|---|---|
| 1 | 0.22 | 220 | 100 | 4100 | 1.E+10 | 9.E+09 | Pass | Fail | Fail |
| 2 | 0.25 | 250 | 80 | 4000 | 2.E+10 | 3.E+10 | Pass | Pass | Pass |
| 3 | 0.35 | 350 | 85 | 3900 | 2.E+10 | 3.E+10 | Pass | Pass | Pass |
| 4 | 0.37 | 370 | 90 | 3800 | 1.E+10 | 1.E+10 | Pass | Pass | Pass |
| 5 | 0.4 | 400 | 95 | 3700 | 6.E+08 | 3.E+08 | Fail | Fail | Fail |
| 6 | 0.44 | 440 | 80 | 4000 | 2.E+10 | 8.E+09 | Pass | Fail | Fail |
| 7 | 0.396 | 396 | 80 | 4000 | 1.E+10 | 9.E+09 | Pass | Fail | Fail |
| 8 | 0.36 | 360 | 80 | 4000 | 1.E+10 | 1.E+10 | Pass | Pass | Pass |
| 9 | 0.31 | 310 | 80 | 4000 | 1.E+10 | 1.E+10 | Pass | Pass | Pass |
| 10 | 0.28 | 280 | 80 | 4000 | 1.E+10 | 1.E+10 | Pass | Pass | Pass |
| 11 | 0.21 | 210 | 80 | 3900 | 1.E+10 | 5.E+09 | Pass | Fail | Fail |
| 12 | 0.2 | 200 | 80 | 3800 | 8.E+09 | 4.E+09 | Pass | Fail | Fail |
| 13 | 0.18 | 180 | 80 | 3700 | 6.E+09 | 3.E+09 | Pass | Fail | Fail |
| 14 | 0.44 | 440 | 80 | 4000 | 2.E+10 | 8.E+09 | Pass | Fail | Fail |
| 15 | 0.396 | 396 | 80 | 4000 | 1.E+10 | 9.E+09 | Pass | Fail | Fail |
| 16 | 0.396 | 396 | 80 | 4000 | 1.E+10 | 1.E+10 | Pass | Pass | Pass |
| 17 | 0.396 | 396 | 80 | 4000 | 1.E+10 | 1.E+10 | Pass | Pass | Pass |
| 18 | 0.396 | 396 | 80 | 4000 | 1.E+10 | 1.E+10 | Pass | Pass | Pass |
| 19 | 0.21 | 210 | 80 | 3900 | 9.E+09 | 5.E+09 | Pass | Fail | Fail |
| 20 | 0.2 | 200 | 80 | 3800 | 8.E+09 | 4.E+09 | Pass | Fail | Fail |
| 21 | 0.18 | 180 | 80 | 3700 | 6.E+09 | 3.E+09 | Pass | Fail | Fail |

**Pass: satisfy X5R, Fail: not satisfy X5R
***Pass: satisfy 85° C., 9.45 V, and 1000 h, Fail: not satisfy these conditions
****Pass: satisfy 85° C., 12.6 V, and 1000 h, Fail: not satisfy these conditions

TABLE 6

| Sample No. | Average size of crystal grains μm | Grain growth ratio % | Curie temperature °C. | Relative dielectric constant (25° C.) — | Insulation resistance (6.3 Vdc) Ω | Insulation resistance (25 Vdc) Ω | Temperature dependence of relative dielectric constant X5R** | Life in high-temperature durability test 85° C., 9.45 V, 1000 h*** | Life in high-temperature durability test 85° C., 12.6 V, 1000 h**** |
|---|---|---|---|---|---|---|---|---|---|
| 22 | 0.3 | 300 | 80 | 4000 | 2.E+08 | 1.E+08 | Pass | Fail | Fail |
| 23 | 0.3 | 300 | 80 | 4000 | 2.E+09 | 1.E+09 | Pass | Fail | Fail |
| 24 | 0.3 | 300 | 80 | 4000 | 1.E+10 | 1.E+10 | Pass | Pass | Pass |
| 25 | 0.3 | 300 | 80 | 4000 | 3.E+10 | 4.E+10 | Pass | Pass | Pass |
| 26 | 0.3 | 300 | 80 | 4000 | 3.E+10 | 2.E+10 | Pass | Pass | Fail |
| 27 | 0.3 | 300 | 80 | 4000 | 3.E+10 | 3.E+10 | Pass | Pass | Fail |
| 28 | 0.3 | 300 | 80 | 4000 | 3.E+10 | 3.E+10 | Pass | Pass | Fail |
| 29 | 0.3 | 300 | 76 | 3600 | 4.E+10 | 3.E+10 | Pass | Pass | Fail |
| 30 | 0.225 | 225 | 80 | 4000 | 1.E+10 | 1.E+10 | Pass | Pass | Pass |
| 31 | 0.275 | 275 | 80 | 4000 | 1.E+10 | 1.E+10 | Pass | Pass | Pass |
| 32 | 0.325 | 325 | 80 | 4000 | 1.E+10 | 1.E+10 | Pass | Pass | Pass |
| 33 | 0.225 | 225 | 80 | 4000 | 1.E+10 | 1.E+10 | Pass | Pass | Pass |
| 34 | 0.32 | 320 | 80 | 4200 | 2.E+10 | 4.E+10 | Pass | Pass | Pass |
| 35 | 0.315 | 105 | 125 | 3000 | 9.E+07 | 5.E+07 | Pass | Fail | Fail |
| 36 | 0.21 | 210 | 115 | 2900 | 2.E+08 | 1.E+08 | Pass | Fail | Fail |
| 37 | 0.12 | 120 | 100 | 3200 | 2.E+08 | 1.E+08 | Pass | Fail | Fail |
| 38 | 0.35 | 350 | 85 | 3850 | 2.E+10 | 2.E+10 | Pass | Pass | Pass |
| 39 | 0.35 | 350 | 85 | 3850 | 2.E+10 | 2.E+10 | Pass | Pass | Pass |
| 40 | 0.35 | 350 | 85 | 3850 | 2.E+10 | 2.E+10 | Pass | Pass | Pass |
| 41 | 0.35 | 350 | 85 | 3850 | 2.E+10 | 2.E+10 | Pass | Pass | Pass |

TABLE 6-continued

| Sample No. | Average size of crystal grains μm | Grain growth ratio % | Curie temperature °C. | Relative dielectric constant (25° C.) — | Insulation resistance (6.3 Vdc) Ω | Insulation resistance (25 Vdc) Ω | Temperature dependence of relative dielectric constant X5R** | Life in high-temperature durability test 85° C., 9.45 V, 1000 h*** | Life in high-temperature durability test 85° C., 12.6 V, 1000 h**** |
|---|---|---|---|---|---|---|---|---|---|
| 42 | 0.21 | 210 | 85 | 3860 | 2.E+10 | 2.E+10 | Pass | Pass | Pass |
| 43 | 0.397 | 397 | 85 | 3970 | 2.E+10 | 2.E+10 | Pass | Pass | Pass |

**Pass: satisfy X5R, Fail: not satisfy X5R
***Pass: satisfy 85° C., 9.45 V, and 1000 h, Fail: not satisfy these conditions
****Pass: satisfy 85° C., 12.6 V, and 1000 h, Fail: not satisfy these conditions As is clear from Tables 1 to 6, in samples Nos. 2 to 4, 8 to 10, 16 to 18, 24 to 28, 30 to 34, and 38 to 43, which included a dielectric layer formed of a dielectric ceramics that contained predetermined amounts of vanadium, magnesium, manganese, and a rare-earth element (at least one selected from the group consisting of yttrium, dysprosium, holmium, erbium, and terbium) and had a Curie temperature in the range of 80° C. to 90° C., the insulation resistance did not decrease significantly as the direct-current voltage was increased from 6.3 to 25 V, the insulation resistance was $10^{10}\Omega$ or more at an applied voltage of 25 V, and the relative dielectric constant was 3800 or more. In these samples, the growth ratio of the average size of crystal grains after firing to the average particle size of the BT powder before firing was 225% or more. Multilayer ceramic capacitors including a dielectric layer formed of a dielectric ceramics had no defect in the high-temperature durability test at a temperature of 85° C. and an applied voltage of 9.45 V for 1000 hours.

Samples Nos. 2 to 4, 8 to 10, 16 to 18, 24 to 25, 30 to 34, and 38 to 43, which contained 0.25 to 0.35 mol of manganese, showed no decrease in insulation resistance as the direct-current voltage was increased. These samples were judged as "pass" in the high-temperature durability test at a temperature of 85° C. and an applied voltage of 12.6 V for 1000 hours.

In samples Nos. 2 and 3, 9 and 10, 24 and 25, 31 and 32, and 38 to 41, which had the average size of crystal grains in the range of 0.25 to 0.35 μm, the insulation resistance increased with increasing direct-current voltage, indicating that the dielectric ceramics had excellent insulation characteristics.

In contrast, in samples Nos. 1, 5 to 7, 11 to 15, and 19 to 23, the insulation resistance decreased as the direct-current voltage was increased from 6.3 to 25 V, and the insulation resistance at a direct-current voltage of 25 V was less than $10^{10}\Omega$.

A sample No. 29, which contained 0.8 mol of manganese, had a Curie temperature of 76° C. and a relative dielectric constant of 3600, which were lower than those of a dielectric ceramics.

Samples Nos. 35 to 37, which had a growth ratio of the average size of crystal grains after firing to the average particle size of the BT powder before firing in the range of 105% to 210% and a Curie temperature in the range of 100° C. to 125° C., had a relative dielectric constant in the range of 2900 to 3200. In the samples Nos. 35 to 37, the insulation resistance decreased with increasing direct-current voltage, and the insulation resistance at a direct-current voltage of 25 V was less than $10^{10}\Omega$.

Samples Nos. 1, 5 to 7, 11 to 15, and 19 to 23, 29 and 35 to 37 had a life of less than 1000 hours in the high-temperature durability test at a temperature of 85° C. and an applied voltage of 9.45 V.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A dielectric ceramic, comprising:
   a plurality of crystal grains comprising a core-shell structure and comprising barium titanate as a main component;
   at least one grain boundary phase between or among the crystal grains;
   vanadium equivalent to 0.1 mol to 0.2 mol of $V_2O_5$ per 100 mol of barium of the barium titanate;
   magnesium equivalent to 0.55 mol to 0.75 mol of MgO per 100 mol of barium of the barium titanate;
   at least one rare-earth element (RE) equivalent to 0.55 mol to 0.75 mol of $RE_2O_3$ comprising at least one of yttrium, dysprosium, holmium, erbium, and terbium per 100 mol of barium of the barium titanate; and
   manganese equivalent to 0.25 mol to 0.6 mol of MnO, per 100 mol of barium of the barium titanate,
   wherein the dielectric ceramic has a Curie temperature in a range of 80° C. to 90° C. and a relative dielectric constant at 25° C. in the range from 3800 to 4200.

2. The dielectric ceramic according to claim 1, wherein the crystal grains have an average size in a range of 0.25 μm to 0.35 μm.

3. The dielectric ceramic according to claim 1, wherein the manganese equivalent is 0.25 mole to 0.35 mol of MnO, per 100 mol of barium of the barium titanate.

4. The dielectric ceramic according to claim 3, wherein the crystal grains have an average size in a range of 0.25 μm to 0.35 μm.

5. A multilayer ceramic capacitor, comprising:
   at least one dielectric layer comprising a dielectric ceramic, the dielectric ceramic comprising:
      a plurality of crystal grains comprising a core-shell structure and barium titanate as a main component;
      at least one grain boundary phase between or among the crystal grains;
      vanadium equivalent to 0.1 mol to 0.2 mol of $V_2O_5$ per 100 mol of barium of the barium titanate;
      magnesium equivalent to 0.55 mol to 0.75 mol of MgO per 100 mol of barium of the barium titanate;
      at least one rare-earth element (RE), equivalent to 0.55 mol to 0.75 mol of $RE_2O_3$ comprising at least one of yttrium, dysprosium, holmium, erbium, and terbium per 100 mol of barium of the barium titanate; and
      manganese equivalent to 0.25 mol to 0.6 mol of MnO, per 100 mol of barium of the barium titanate,
      wherein the dielectric ceramic has a Curie temperature in the range of 80° C. to 90° C. and a relative dielectric constant at 25° C. in the range from 3800 to 4200; and
   at least one internal electrode layer, alternately stacked with the at least one dielectric layer(s).

6. The multilayer ceramic capacitor according to claim 5, wherein the crystal grains have an average size in a range of 0.25 μm to 0.35 μm.

7. The multilayer ceramic capacitor according to claim 5, wherein the manganese equivalent to 0.25 mol to 0.35 mol of MnO per 100 mol of barium of the barium titanate.

8. The multilayer ceramic capacitor according to claim 7, wherein the crystal grains have an average size in a range of 0.25 μm to 0.35 μm.

* * * * *